United States Patent [19]

Wichterle et al.

[11] Patent Number: 4,722,813
[45] Date of Patent: Feb. 2, 1988

[54] METHOD AND APPARATUS FOR SPREADING MONOMER MIXTURES IN MOLDS FOR THE CENTRIFUGAL CASTING OF CONTACT LENSES

[75] Inventors: Otto Wichterle; Jiri Vodnansky, both of Praha, Czechoslovakia

[73] Assignee: Ceskoslovenska akademie ved, Praha 1, Czechoslovakia

[21] Appl. No.: 691,424

[22] Filed: Jan. 14, 1985

[30] Foreign Application Priority Data

Jan. 26, 1984 [CS] Czechoslovakia ............... 590-84

[51] Int. Cl.⁴ ............................................. B29D 11/00
[52] U.S. Cl. .................................... 264/2.1; 264/311; 425/429; 425/430; 425/808
[58] Field of Search ............... 264/1.1, 2.2, 310, 311, 264/1.4; 425/429, 808, 174.4, 430

[56] References Cited

U.S. PATENT DOCUMENTS

| | | | |
|---|---|---|---|
| 3,337,662 | 8/1967 | Spencer | 425/429 |
| 4,422,984 | 12/1983 | Neefe | 264/2.1 |
| 4,424,175 | 1/1984 | Neefe | 264/2.1 |
| 4,517,139 | 5/1985 | Rawlings | 425/808 |

FOREIGN PATENT DOCUMENTS 933473 6/1982 U.S.S.R. ............... 264/2.1

Primary Examiner—Lowe, James
Attorney, Agent, or Firm—Dilworth & Barrese

[57] ABSTRACT

A method and apparatus are provided for spreading monomer mixture in molds for the centrifugal casting of contact lenses, wherein the said molds containing a monomer mixture are rotated around their axis with the frequency 0.5 to 5 revolutions per minute and, at the same time, the axis of molds is periodically tilted between extreme positions, the angle to the vertical direction of which is in the first extreme position 30° to 60° and in the second extreme position 70° to 100° and the frequency of tilting is twice to ten times lower than the frequency of rotation.

8 Claims, 2 Drawing Figures

METHOD AND APPARATUS FOR SPREADING MONOMER MIXTURES IN MOLDS FOR THE CENTRIFUGAL CASTING OF CONTACT LENSES

BACKGROUND OF THE INVENTION

The invention pertains to a method and apparatus for spreading monomer mixtures in molds for the centrifugal casting of contact lenses.

In the monomer casting of contact lenses in rotating molds provided with a limiting sharp edge according to the Czechoslovak Pat. No. 116,260 (counterpart to U.S. Pat. No. 3,408,429), the monomer mixture has to be introduced as high as very near to the limiting edge. This has been achieved, e.g., by rotating the mold, before it is exposed to the polymerization conditions, to a higher speed than is the rotation speed eventually required for the formation of a precise meniscus just before starting the polymerization. Another method has consisted in introducing a fine stationary string into the rotating mold which stirs and lifts the rotating mixture up to the sharp edge. A similar effect of even spreading of the monomer mixture was also obtained by introducing a sharp stream of nitrogen into the rotating mold to stir the monomer mixture.

The above said methods cannot be used in the novel method of centrifugal casting in rotating columns, which carry a column of molds with monomer mixture, e.g., according to the Czechoslovak Pat. No. 159,359 and the Czechoslovak Patent Application No. PV 1027-83 now Czechoslovak Certificate of Authorship No. 237,592. It was possible to help the mixture in spreading in the molds which form a column in tubular magazines by subjecting the magazines to a very slow rotation in an oblique position, when the monomer mixture coalesced in a drop, which slowly moved along the limiting sharp edge. This method was fairly successful in the production of a relatively thick-walled lenses. As soon as the trend in contact lenses has been directed to ultrathin lenses, complications occured caused by the fact, that a thin film of a small charge of monomer mixture did not manage to flow as far as to the edge at a small slope of the slowly rotating mold or a rather tin film was formed in the center of mold at a too large slope of the rotating mold, which broke through thus forming a hole in the center of a nonwetted pair of the mold during the following polymerization.

SUMMARY OF THE INVENTION

The reliable wetting of the mold is achieved according to the present invention even with the smallest charges of monomer mixture, if the slow rotation of mold with the charged mixture 0.5 to 5 r.p.m. is combined with a periodical tilting of the mold axis. The best result is obtained when the frequency of tilting the mold axis is several times /twice to tentimes/ lower than is the frequency of its rotation around the axis. Under the aforesaid conditions, the mold can be tilted, for the perfect wetting of its edge, as much as to the horizontal position, without breaking the film in the center of mold, because the mold axis is again lifted into a less tilted position after a short period of time.

In the production of ultrathin contact lenses with the central thickness as small as 0.02 mm, it proved suitable to tilt the mold axis between extreme positions when the mold axis includes with the vertical direction the angle 60° and 90° to 100°, respectively. Smaller slopes of the axis are more suitable for molds with some larger charge of monomer mixture, i.e. the angles 30° and 70° included by the mold axis and the vertical direction in the extreme positions.

This complex motion of molds containing the monomer mixture may be realized with a relatively simple apparatus, which is also an object of this invention.

The apparatus according to the invention has a body swingingly connected to a stable base and provided with a revolving element for clamping the tubular magazine, whereas the body is kinematically connected with a tilting mechanism. An arm with a support for supporting the tubular magazine may be connected to the body. The revolving element for clamping the tubular magazine, which is performed on the body, can be advantageously joined with at least one other revolving element for clamping of tubular magazines and, in this case, the support has the shape of a comb. These revolving elements for clamping of tubular magazines are advantageously interconnected, for example, with gears.

One or two periods of tilting suffice as a rule for the perfect spreading of monomer mixture. However, the said combined motions can be continued practically without limitation so that the set of magazines with molds charged with the monomer mixture may form a flexible reserve, which balances the contingent fluctuation between an apparatus for dosing the monomer mixture into molds and a polymerization column.

The periodical tilting of mold may have various courses. A harmonic or approximately harmonic course of tilting very well suits to the above described function and may be obtained when using a most simple crank mechanism. It is advantageous, if the axis of molds remains, during the motion, in both dead centers for a relatively long time in comparison with the duration of their transfer from one extreme position to the other. The motion which even more reduces the tilting period between the extreme positions in comparison with time of standing in the extreme positions is probably even more preferable. Such motion in tilting can be attained by means of a suitably shaped cams or by means of a servomotor controlled with a time switch and the desired extreme positions with terminal switches. Similar result may be achieved by means of a pneumatic drive of transfers, which is controlled by a timed distributor of pressure and by stops delimiting the extreme positions.

BRIEF DESCRIPTION OF THE DRAWINGS

The invention will be further understood with reference to the accompanying drawings in which.

Throughout the following description, like reference numerals are used to denote like parts in the drawings.

DESCRIPTION OF THE PREFERRED EMBODIMENT

Figure 1:
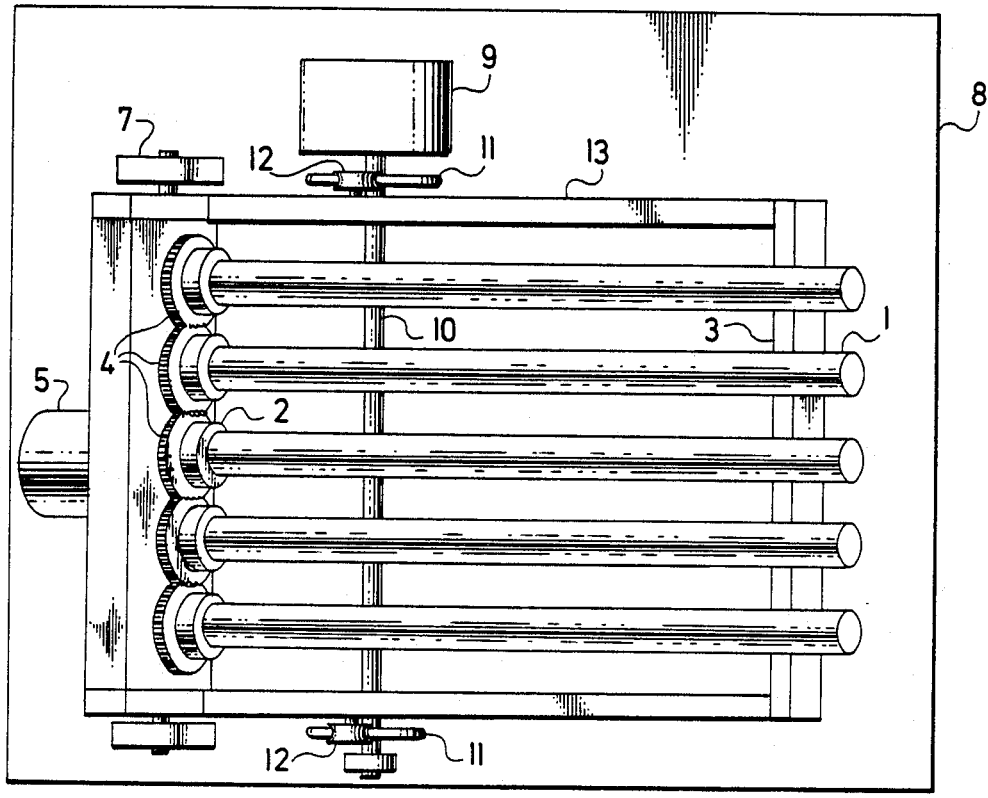
FIG. 1 is a top plan view of apparatus for spreading monomer mixtures in molds as provided by the present invention.
Figure 2:
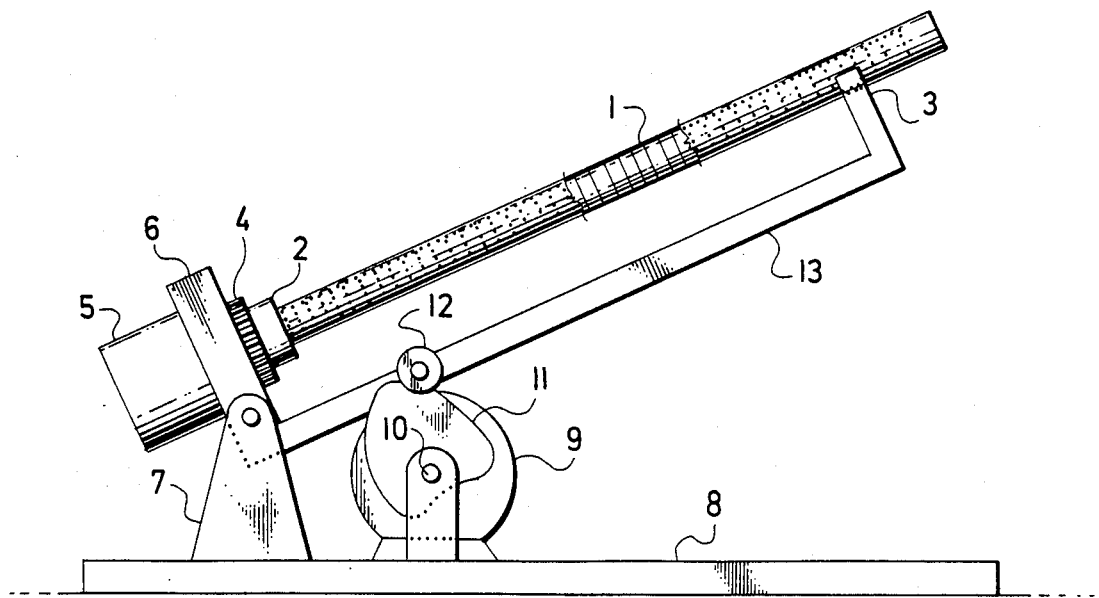
FIG. 2 is a side elevational view of the FIG. 1 apparatus.

Tabular magazines 1 filled with a column of molds, containing a metered drop of a monomer mixture, are inserted at one end into a revolving element 2 or socket in which the magazine can be clamped and at the other end, the magazine lean against a support 3. Rotation of the revolving element 2 is realized by means of a row of mutually engaged gears 4, one of which is coupled with the axis of a geared motor 5. The parts 2, 3, 4 and 5 are connected to a body 6 swinging around bearings 7 placed in bushes, which are fixed to a stable base 8. Another geared motor 9 is also fixed to the base and carries, at both sides of its horizontal shaft 10, two cams 11 having the shape of cardioids, whereas a frame 13 connecting the supporting comb 3 with the body 6 rests on these cams by means of rollers 12. The gear ratio of the motor 5 is chosen in such a way, that the revolving elements 2 rotate three times in a minute, and the speed of the geared motor 9 in such a way, that its shaft 10 rotates once in three minutes. The cams 11 are designed in such a way, that the tubular magazines include, in the upper dead center, with the vertical direction the angle of 60° and, in the lower dead center, the angle of 100°. The angles in extreme positions may be adjusted to other values by shifting the rollers 12 along the arms of frame 13, replacing the cams, or changing the distance between the shaft 10 and the axis of bearings 7.

The shown diagram is an example chosen by chance of many other possible design of the apparatus, having the same or similar function. In particular, the swinging motion can be achieved by other known mechanical elements, for example, using a crank shaft connected to time switches, which extend the residence time in the extreme positions, or using pneumatic lifting and lowering of a set of magazines by means of a pneumatic or hydraulic mechanism controlled by the programmable motion of a multiway valve.

The method according to the invention, which is carried out by the disclosed apparatus, has an advantage, in comparison with the methods for spreading a monomer mixture performed so far, not only because it is less laborious, but above all in the precise reproducibility of the procedure leading thus to the precisely reproducible quality of edges of the produced contact lenses.

What is claimed is:

1. Method for spreading monomer mixture in molds for the centrifugal casting of contact lenses which comprises rotating said molds containing a monomer mixture around their axis with the frequency 0.5 to 5 revolutions per minute and, at the same time, tilting the axis of the molds periodically between extreme positions, the angle to the vertical direction of which is in the first extreme position 30° to 60° and in the second extreme position 70° to 100° and the frequency of tilting is twice to ten times lower than is the frequency of rotation.

2. Apparatus for spreading monomer mixture in tubular molds for the centrifugal casting of contact lenses, said apparatus comprising a body for holding a tubular magazine containing a column of the tubular molds, said body including a revolving element for reception and clamping of the tubular magazine, means for rotating the magazine whereby the contained molds are rotated about their axes, and tilting mechanism for periodically tilting said body to correspondingly tilt the axes of the magazine contained molds as they are rotating.

3. The apparatus according to claim 2, wherein an arm with a support for supporting the tubular magazine is connected to the body.

4. The apparatus according to claim 2, wherein the revolving element for clamping the tubular magazine which is performed on the body is connected with at least one further revolving element for clamping the tubular magazine and the support for supporting the tubular magazine has a shape of a comb.

5. The apparatus according to claim 4, wherein the revolving elements for clamping the tubular magazines are interconnected by gears.

6. The apparatus according to claim 2, wherein the tilting mechanism is formed by a shaft of a motor and by cams fixed to this shaft.

7. The apparatus according to claim 2, wherein the tilting mechanism is formed by a revolving crank on the shaft of a motor.

8. The apparatus according to claim 2, wherein the tilting mechanism is formed by a piston of a hydraulic or pneumatic installation.

* * * * *